United States Patent
Kaskawitz et al.

(10) Patent No.: US 11,528,841 B2
(45) Date of Patent: Dec. 20, 2022

(54) ADJUSTABLE ELECTRIC CONTROL HANDLE FOR A LAWN MOWER

(71) Applicant: Honda Motor Co., Ltd., Tokyo (JP)

(72) Inventors: Scott J. Kaskawitz, Hillsborough, NC (US); Andrew E. Bejcek, Chapel Hill, NC (US); Lawrence J. Lardieri, Greensboro, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 743 days.

(21) Appl. No.: 16/535,666

(22) Filed: Aug. 8, 2019

(65) Prior Publication Data
US 2021/0037701 A1 Feb. 11, 2021

(51) Int. Cl.
*A01D 34/00* (2006.01)
*G05G 1/04* (2006.01)
(Continued)

(52) U.S. Cl.
CPC ....... *A01D 34/006* (2013.01); *G05B 19/4155* (2013.01); *G05G 1/01* (2013.01);
(Continued)

(58) Field of Classification Search
CPC .............. A01D 34/006; A01D 34/6812; A01D 34/6806; A01D 34/824; A01D 2034/6843;
(Continued)

(56) References Cited

U.S. PATENT DOCUMENTS 5,375,674 A * 12/1994 Peter ................... A01D 34/6806
56/11.1
6,769,501 B2 * 8/2004 Iida ..................... A01D 34/6806
180/315
(Continued)

FOREIGN PATENT DOCUMENTS

| CN | 203968675 | | 12/2014 | | |
|---|---|---|---|---|---|
| DE | 102010044302 A1 | * | 3/2012 | ........... | A01D 34/824 |
| DE | 102013223800 A1 | * | 5/2015 | ......... | A01D 34/6806 |

OTHER PUBLICATIONS

EPO Translation of the Description of DE 102013223800 A1, Quigley et al., May 21, 2015. (Year: 2022).*

(Continued)

*Primary Examiner* — Daniel D Yabut
(74) *Attorney, Agent, or Firm* — Rankin, Hill & Clark LLP (57) ABSTRACT

A control handle for a lawn mower includes a first lever and a second lever facing the first lever. Each lever is configured to actuate between an extended position and a depressed position. A controller is operatively associated with each of the first lever and the second lever so as to determine a position of the first lever with respect to the depressed position or the extended position of the first lever, and a position of the second lever with respect to the depressed position or the extended position of the second lever. Also, the first lever defines an interior having an opening facing the second lever such that the interior of the first lever is configured for receiving the second lever when at least one (Continued)

of the first lever and the second lever are actuated toward the respective depressed position.

20 Claims, 6 Drawing Sheets

(51) Int. Cl.
    *G05B 19/4155*    (2006.01)
    *G05G 1/01*    (2008.04)
    *A01D 101/00*    (2006.01)

(52) U.S. Cl.
    CPC ........... *G05G 1/04* (2013.01); *A01D 2101/00* (2013.01); *G05B 2219/50327* (2013.01)

(58) Field of Classification Search
    CPC ........ G05G 1/01; G05G 1/04; G05B 19/4155; G05B 2219/50327
    See application file for complete search history.

(56) References Cited

U.S. PATENT DOCUMENTS

| | | |
|---|---|---|
| 7,275,615 B2 | 10/2007 | Derby et al. |
| 7,677,017 B2 | 3/2010 | Holby |
| 7,698,881 B2 | 4/2010 | McCane et al. |
| 7,762,050 B1 | 7/2010 | Kaskawitz |
| 8,312,946 B2 | 11/2012 | Lahey et al. |
| 9,163,707 B2 | 10/2015 | Helin et al. |
| 9,185,843 B2 | 11/2015 | Kaskawitz et al. |
| 9,338,940 B2 | 5/2016 | Bejcek et al. |
| 9,403,435 B2 | 8/2016 | Bejcek |
| 9,470,305 B2 | 10/2016 | Kaskawitz et al. |
| 9,538,699 B1 | 1/2017 | Bejcek et al. |
| 9,545,054 B2 | 1/2017 | Prinzo |
| 9,696,749 B2 | 7/2017 | Kaskawitz et al. |
| 2014/0345416 A1* | 11/2014 | Kaskawitz ............. G05G 13/00 74/490.14 |
| 2016/0081267 A1* | 3/2016 | Barendrecht ............ G05G 1/04 701/22 |
| 2018/0146617 A1* | 5/2018 | Oota ...................... A01D 69/02 |
| 2019/0299795 A1* | 10/2019 | Yan ......................... B60L 15/30 |

OTHER PUBLICATIONS

EPO Translation of the Description of DE 102010044302 A1, Filippo et al., Mar. 8, 2012. (Year: 2022).*

* cited by examiner

FIG.1

Section A-A

ADJUSTABLE ELECTRIC CONTROL HANDLE FOR A LAWN MOWER

BACKGROUND

Self-propelled machines such as lawn mowers often provide handles on which controls are mounted for manipulation by a user. Known lawn mowers generally include the handle extending behind a main operative assembly of the lawn mower, the handle including gripping areas for gripping by a user as the user walks behind the lawn mower during movement thereof in a forward direction. Because lawn mower handles often require the user to constantly grip the handle during operation, one or more controls are mounted on the handles for the user to manipulate while gripping the handles and operating the lawn mower. With this construction, access to controls by the user during operation of the lawn mower are limited to those controls disposed on the gripping areas. Further, due to the limited space for gripping areas provided on lawn mower handles having ergonomic designs, ergonomic lawn mower handles feature limited control means available to the user while operating the lawn mower. Additionally, because lawn mower handle gripping areas feature limited space for controls, known lawn mower control handles lack the ability to adjust preset ground speeds of the lawn mower while the lawn mower is in operation, or a clutch disposed on the handle for modulating the lawn mower ground speed.

SUMMARY

According to one aspect, an adjustable electric control handle for a lawn mower includes a first lever configured to actuate between an extended position and a depressed position and a second lever configured to actuate between an extended position and a depressed position. The second lever faces the first lever such that a section of the first lever is closer to the second lever when the first lever is in the depressed position relative to the extended position, and a section of the second lever is closer to the first lever when the second lever is in the depressed position relative to the extended position. A controller is operatively associated with each of the first lever and the second lever so as to determine a position of the first lever with respect to the depressed position or the extended position of the first lever, and a position of the second lever with respect to the depressed position or the extended position of the second lever. Also, the first lever defines an interior having an opening facing the second lever such that the interior of the first lever is configured for receiving the second lever when at least one of the first lever and the second lever are actuated toward the respective depressed position.

According to another aspect, an adjustable electric control handle for a lawn mower includes a cover, a first lever disposed within the cover and pivotally fixed to the cover, and a second lever disposed within the cover. The second lever is pivotally fixed to the first lever and the cover such that the first lever and second lever share a common axis of rotation with respect to the cover. The first lever and the second lever face each other within the cover such that a middle section of the first lever is closer to the second lever when the first lever is in a depressed position relative to an extended position of the first lever, and a middle section of the second lever is closer to the first lever when the second lever is in a depressed position relative to an extended position of the second lever.

According to another aspect, a handle assembly for a lawn mower includes a clutch lever, a brake lever, a first sensor target fixed to the clutch lever, a second sensor target fixed to the brake lever, a controller configured for controlling the ground speed of the lawn mower, a first sensor incorporated into the controller, and a second sensor incorporated into the controller. The clutch lever is configured to actuate between an extended position and a depressed position. The brake lever is configured to actuate between an extended position and a depressed position, the brake lever pivotally fixed with the clutch lever such that the clutch lever and the brake lever share a common axis of rotation. A position of the first sensor target is dispositive of a position of the clutch lever between the extended position and the depressed position of the clutch lever, and a position of the second sensor target is dispositive of a position of the brake lever between the extended position and the depressed position of the brake lever. A ground speed of the lawn mower is controlled by the controller, including setting each of a top ground speed which is between a maximum ground speed and a minimum ground speed, detecting a position of each of the clutch lever and the brake lever with respect to the extended position and depressed position, and relating the detected position of the clutch lever to an output ground speed that is between the top ground speed and the minimum ground speed. The first sensor is configured for detecting the position of the first sensor target, and the second sensor is configured for detecting the position of the second sensor target. The controller continuously detects the position of the clutch lever during operation of the lawn mower so as to enable modulation of the output ground speed during operation of the lawn mower.

DETAILED DESCRIPTION

Figure 1:
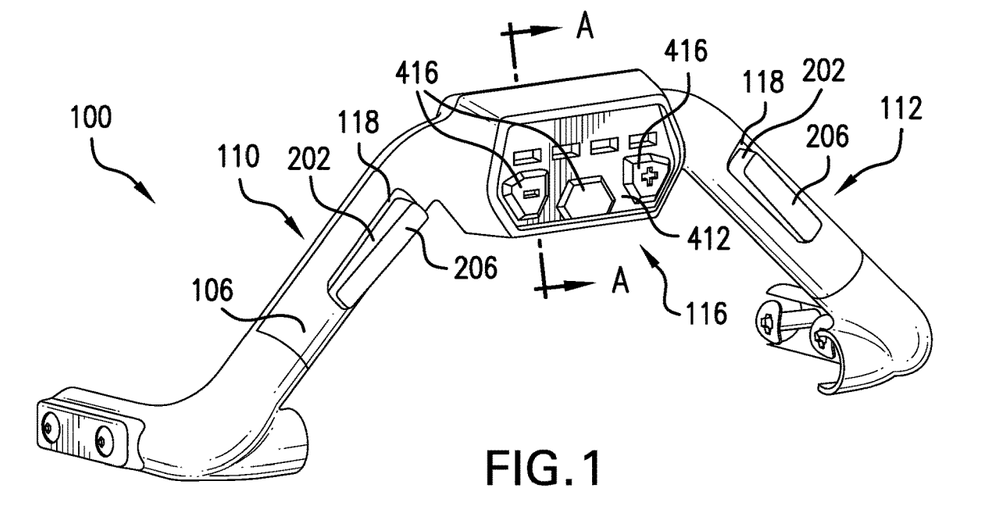
FIG. 1 is a perspective view of an exemplary adjustable electric control handle for a lawn mower according to the present disclosure.
Figure 3:
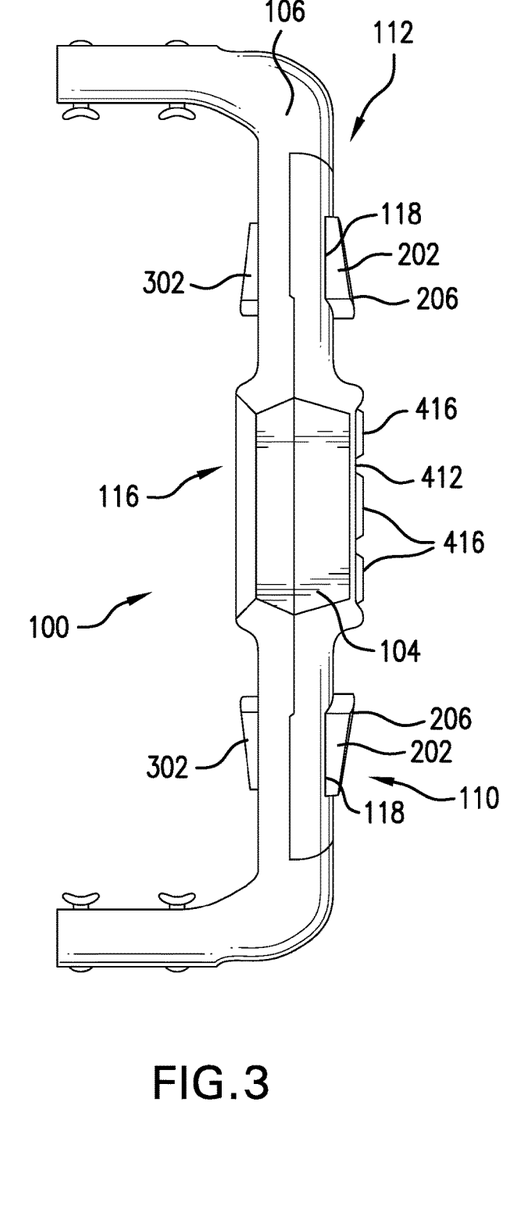
FIG. 3 is a top view of the control handle.
Figure 4:
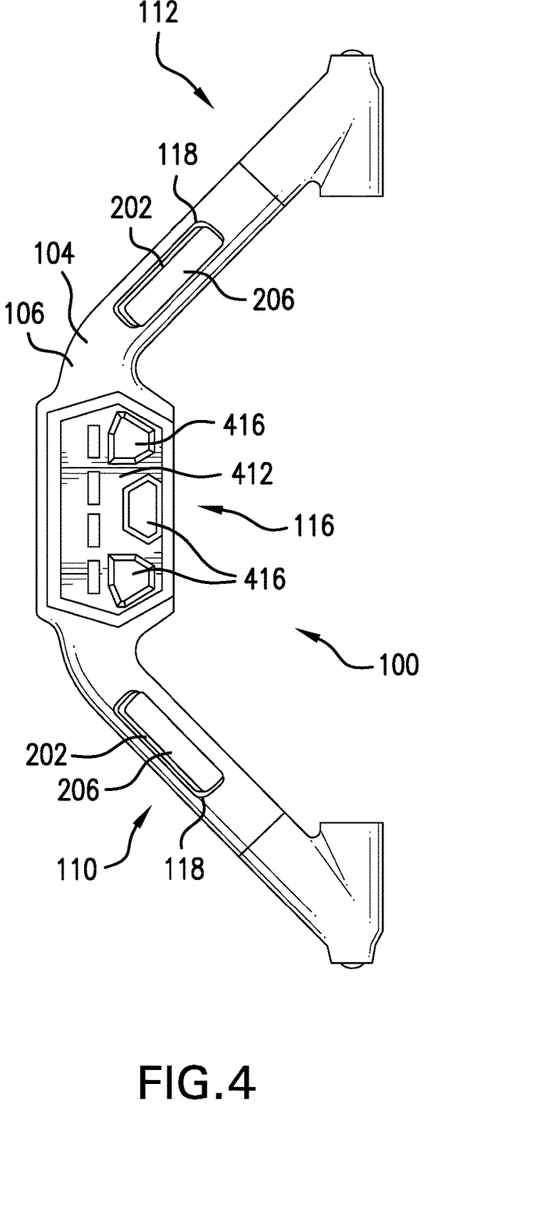
FIG. 4 is a front view of the control handle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1, 3 and 4 illustrate an adjustable electric control handle 100 for an associated lawn mower (not shown) according to the present disclosure. The handle includes a cover 104 which defines a handle exterior 106 that is ergonomically formed to include each of a first gripping area 110 and a second gripping area 112. Both the first gripping area 110 and the second gripping area 112 are bent downwards from a handle center 116 for being gripped by a user. As shown, the first gripping area 110 and the second gripping area 112 are typified by a first hole 118 and a second hole 122 defined in the cover 104 and respectively configured for a first button 202 of a first lever 200 (FIG. 5) and a second button 302 of a second lever 300 (FIG. 5) extending therethrough, beyond the exterior defined by the cover 104. Each of the first button 202 and second button 302 are normally biased in an extended position beyond the handle exterior 106 such that a user gripping the handle 100 over the first button 202 and second button 302 will actuate the first button 202 and second button 302 towards a respective depressed position. To provide an ergonomic gripping area 110, 112, an exterior surface 206 of the first button 202 and an exterior surface 306 of the second button 302 extend slightly outwardly from and are parallel along the gripping area 110, 112 when each of the first button 202 and second button 302 are in the respective extended position (FIG. 7).

The first button 202 and the second button 302 respectively extend from the first lever 200 and the second lever 300. The first lever 200 and the second lever 300 are each disposed in the cover 104 and are configured for actuating between a respective extended position and depressed position. As shown between FIGS. 8 and 9, the extended position and depressed position of both the first button 202 and second button 302 respectively correspond to the extended position and depressed position of the first lever 200 and the second lever 300. The depressed position of the first lever 200 defines an end of a range of motion of the first lever 200 that is unobstructed by the second lever 300, and the depressed position of the second lever 300 defines an end of a range of motion of the second lever 300 that is unobstructed by the first lever 200. As depicted, the first lever 200 and the second lever 300 are configured for being simultaneously actuated into the respective depressed positions.

Figure 7:
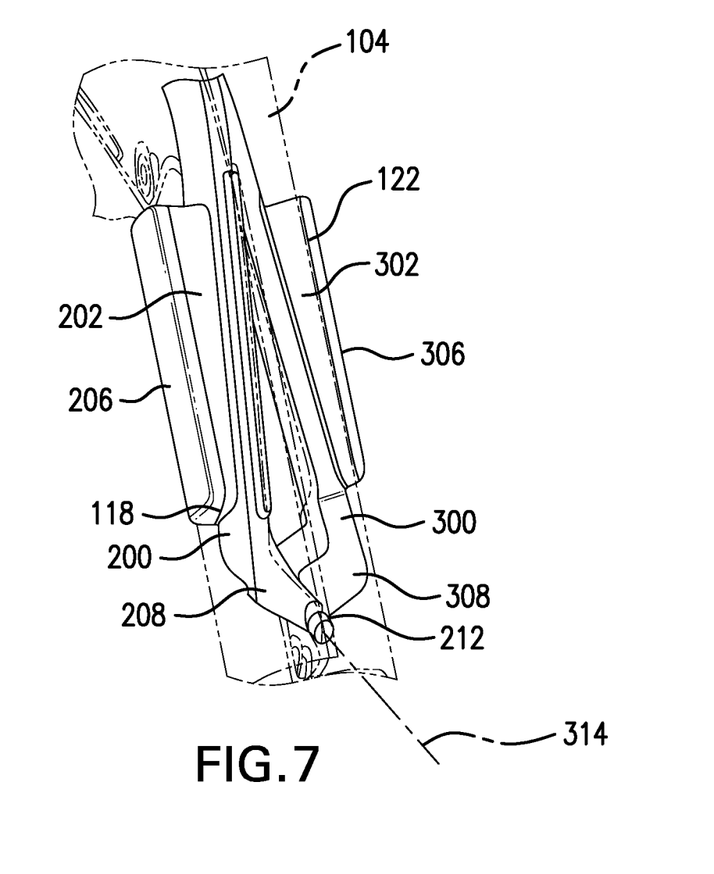
FIG. 7 is a partial perspective view of the control.

As shown in FIG. 7, the first button 202 is defined by a raised portion of the first lever 200 which extends away from the second lever 300 and through the first hole 118 defined by the cover 104. The second button 302 is defined by a raised portion of the second lever 300 which extends away from the first lever 200 and through the second hole 122 defined by the cover 104. In this manner, each of the first lever and the second lever are biased toward the respective extended position and are configured to be actuated toward the respective depressed position by pressing the first button 202 and second button 302 respectively. Both the first lever 200 and the second lever 300 are disposed in the cover 104 facing each other, such that the first lever 200 is closer to the second lever 300 when the first lever 200 is in the depressed position relative to the extended position, and the second lever 300 is closer to the first lever 200 when the second lever 300 is in the depressed position.

Figure 5:
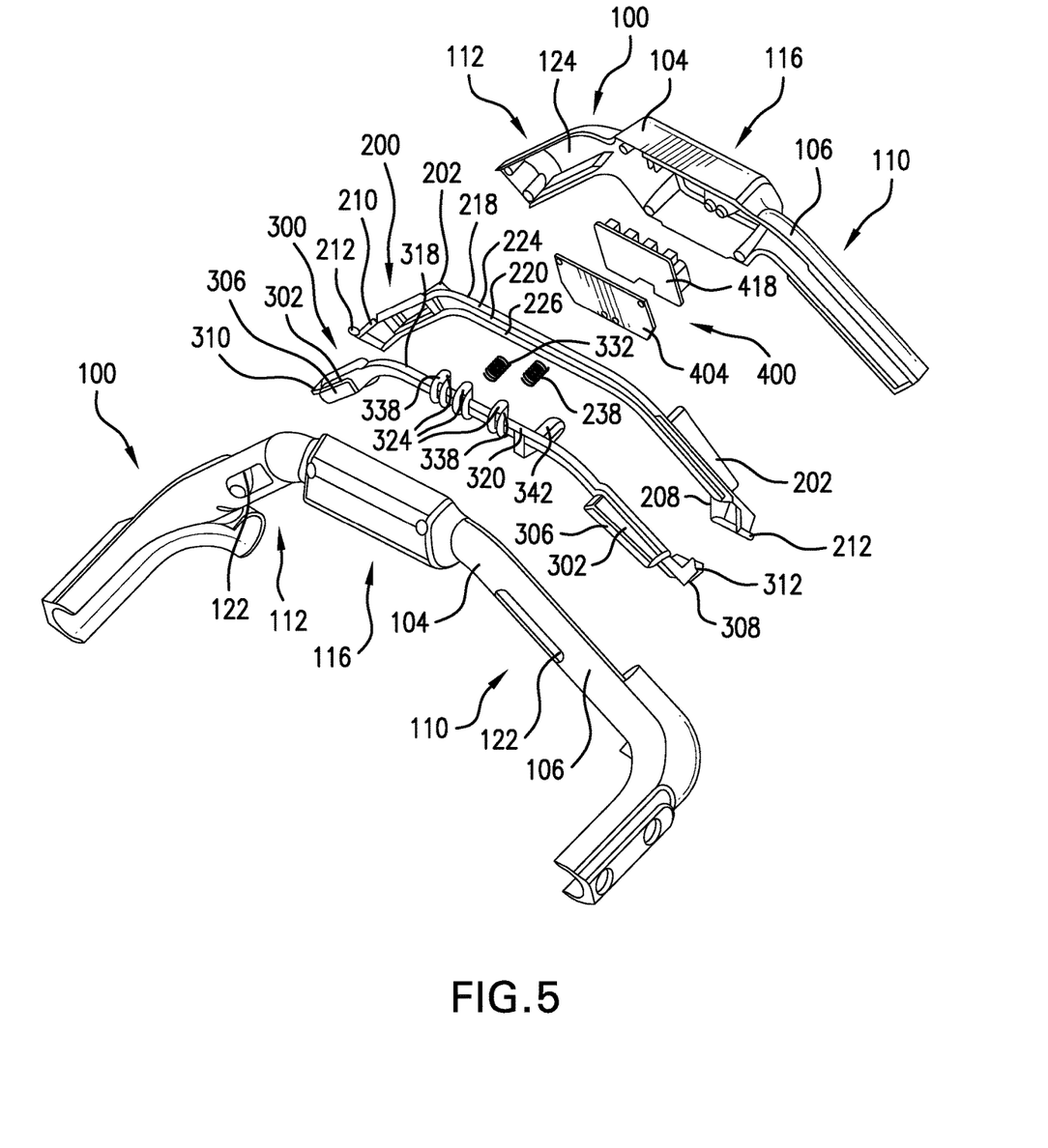
FIG. 5 is an exploded perspective view of the control handle.
Figure 6:
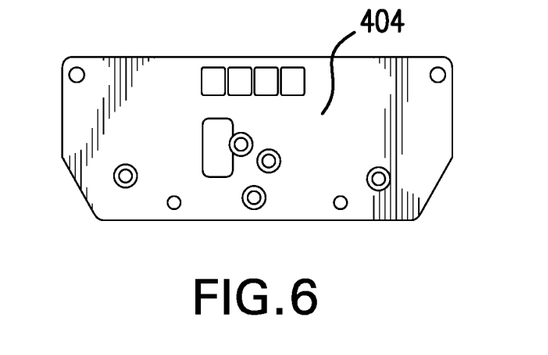
FIG. 6 is a front view of a printed circuit board incorporated in the control handle.
Figure 11:
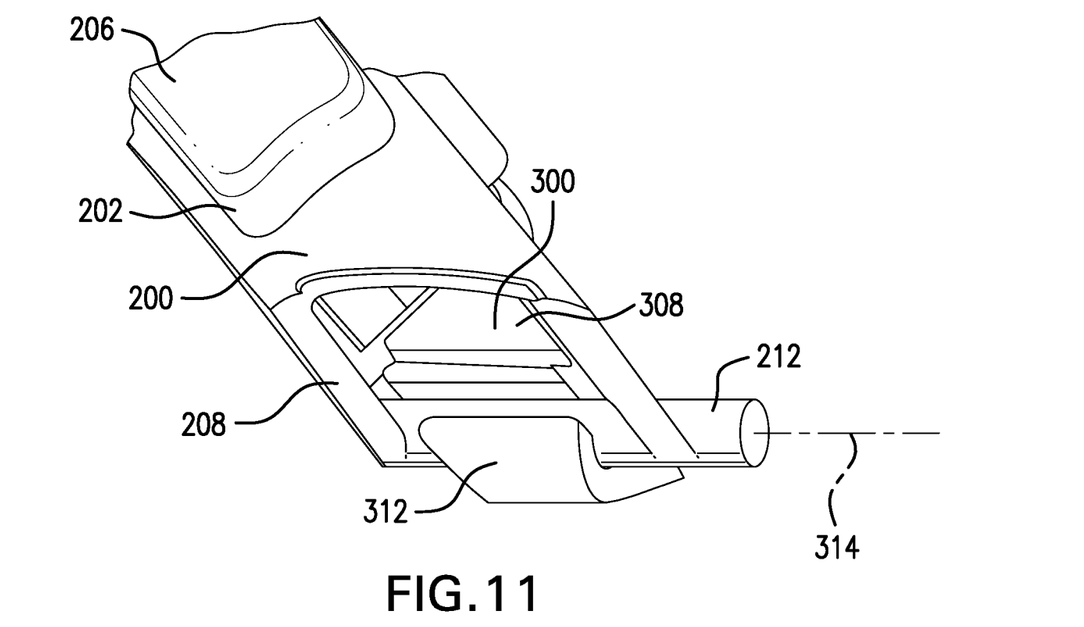
FIG. 11 is a partial perspective view of the control handle.

As shown in FIG. 5, the first lever 200 includes a first end 208 and a second end 210 typified by a pin 212 integrally formed therefrom and configured for extending toward an inner surface 124 of the cover 104 when the handle 100 is assembled. The second lever 300 includes a first end 308 and a second end 310 typified by a hinge 312 (FIG. 11) formed therein and configured for receiving the pin 212. When the first lever 200 and the second lever 300 are assembled, the pin 212 extends through the hinge 312 so as to pivotally fix the first lever 200 with the second lever 300 at the first ends 208, 308 and the second ends 210, 310 respectively. According to one aspect, the pin 212 engages the hinge 312 in a snap-fit connection and the rotation of the first lever 200 and the second lever 300 allowed by the snap-fit connection defines a common axis of rotation 314 for each of the first lever 200 and second lever 300. As shown in FIG. 7, the pin 212 further extends into the cover 104 such that the first lever 200 and second lever 300 are pivotally fixed to each other and the cover 104 at the first ends 208, 308, and the second ends 210, 310 respectively. With this construction, each first end 208, 308 and second end 210, 310 is configured to rotate about the common axis of rotation 314.

With reference to FIG. 5, a middle section 218 of the first lever 200 connects the first end 208 and the second end 210 of the first lever 200, and is configured to rotate about the common axis of rotation 314 with the first end 208 and second end 210 of the first lever 200. A middle section 318 of the second lever 300 connects the first end 308 and the second end 310 and is configured to rotate about the common axis of rotation 314 with the first end 308 and the second end 310.

Figure 8:
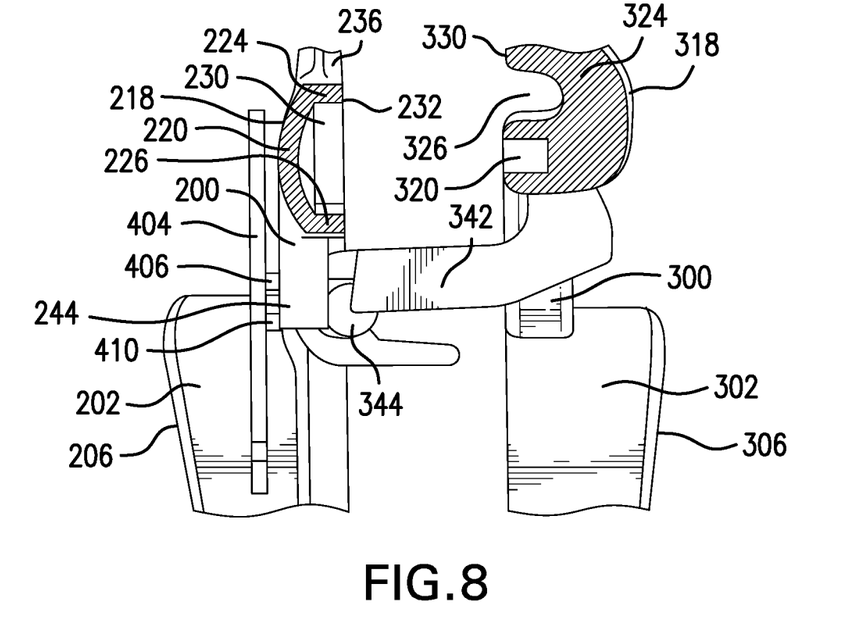
FIG. 8 is a partial cross-sectional view of the control handle in one operational position.
Figure 9:
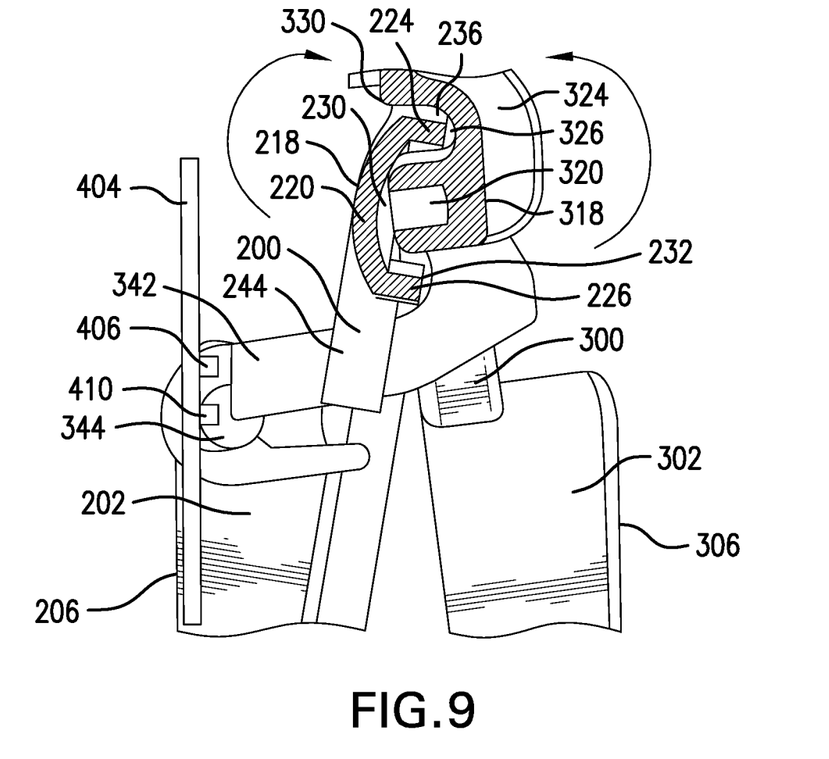
FIG. 9 is a partial cross-sectional view of the control handle in another operational position.

In FIGS. 7, 8, and 9, the first lever 200 and the second lever 300 face each other within the cover 104 such that the middle section 218 of the first lever 200 is closer to the second lever 300 when the first lever 200 is in the depressed position relative to the extended position of the first lever 200, and the middle section 318 of the second lever 300 is closer to the first lever 200 when the second lever 300 is in the depressed position relative to the extended position of the second lever 300. As shown in FIGS. 2 and 8-10, the middle section 218 of the first lever 200 includes a curved middle portion 220 featuring an upper side wall 224 and a lower side wall 226 extending parallel toward the second lever 300 from opposite edges of the curved middle portion 220 so as to define an interior 230 of the first lever 200. The interior 230 of the first lever 200 includes an opening 232 that faces the second lever 300 and is configured for receiving the second lever 300 when at least one of the first lever 200 and the second lever 300 are actuated towards the respective depressed position.

The second lever 300 includes a body 320 and at least one second lever finger 324 extending from the body 320 so as to define an interior 326 of the second lever 300 with the body 320. The interior 326 of the second lever 300 defines an opening 330 facing the first lever 200 such that the second lever 300 is configured for receiving the first lever 200 when at least one of the first lever 200 and the second lever 300 are actuated towards the respective depressed position. Specifically, in the depicted embodiment of FIG. 9, the second lever 300 is configured for receiving the upper side wall 224 of the first lever 200 between the body 320 of the second lever 300 and the at least one second lever finger 324, while the first lever 200 is configured to receive the body 320 of the second lever 300 in the interior 230 of the first lever 200 when at least one of the first lever 200 and the second lever 300 are actuated towards the respective depressed position. In this manner, each of the first lever 200 and the second lever 300 is configured for receiving the other of first lever 200 and second lever 300 when at least one of the first lever 200 and the second lever 300 are actuated towards the respective depressed position. With this construction, each of the first lever 200 and second lever 300 have a relatively large lever stroke within ergonomic constraints of the handle 100.

Figure 2:
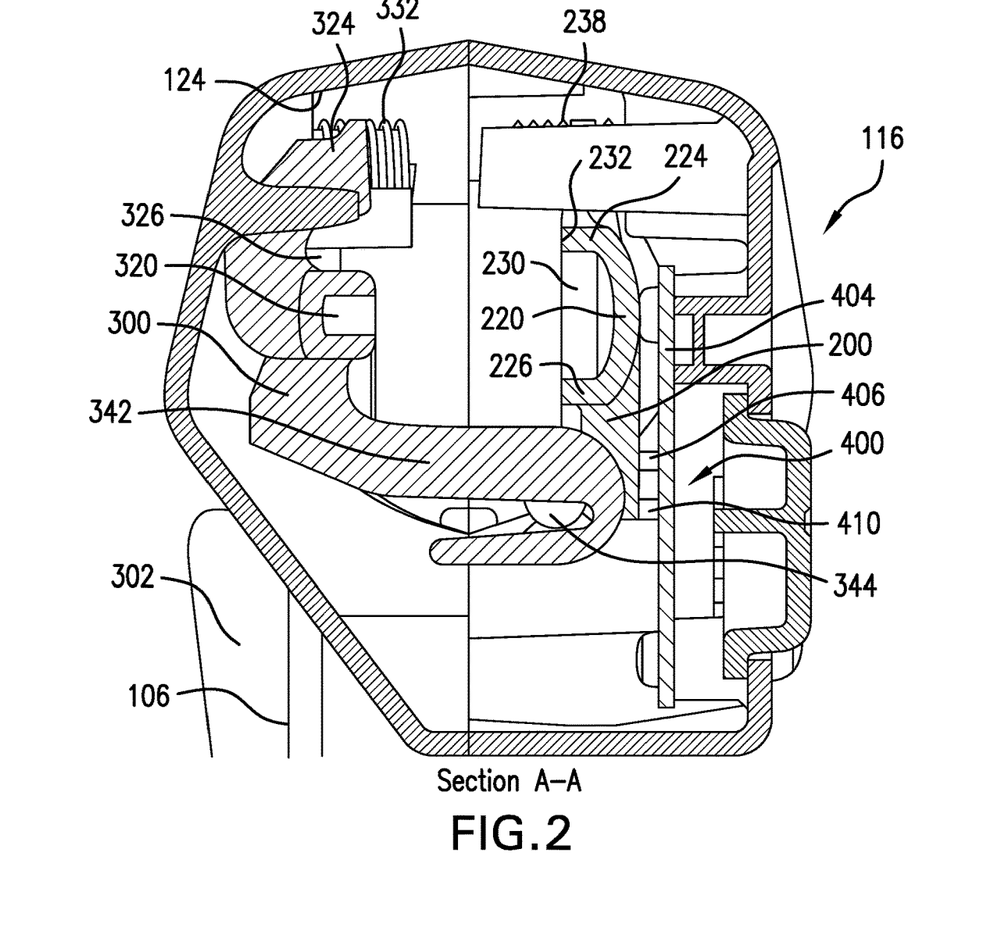
FIG. 2 is a cross-sectional view of the control handle taken along line A-A of FIG. 1.
Figure 10:
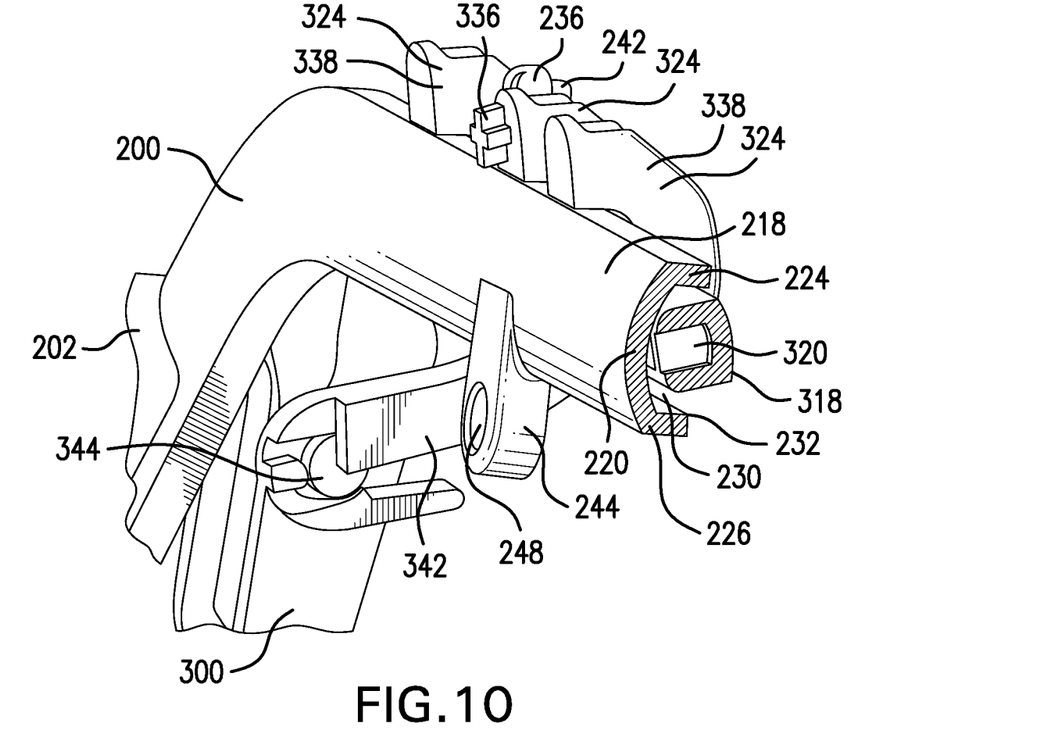
FIG. 10 is a partial cross-sectional perspective view of the control handle.

As shown in FIG. 10, the first lever 200 includes at least one first lever finger 236 extending from the first lever 200 and toward the inner surface 124 of the cover 104. As shown in FIGS. 2 and 5, the middle section 218 of the first lever 200 and the middle section 318 of the second lever 300 are each biased away from the other of the middle section 218 of the first lever 200 and the middle section 318 of the second lever 300 and toward the respective extended position by a first lever biasing member 238 and a second lever biasing member 332 respectively. The first lever biasing member 238 is interposed between the at least one first lever finger 236 and the cover 104, and the second lever biasing member 332 is interposed between the at least one second lever finger 324 and the cover 104.

Further depicted in FIG. 10, the at least one first lever finger 236 includes a first lever protrusion 242 that extends from the at least one first lever finger 236 toward the inner surface 124 of the cover 104. The first lever protrusion 242 is configured to secure the first lever biasing member 238 when the first lever biasing member 238 is assembled with the first lever 200. The at least one second lever finger 324 includes a second lever protrusion 336 that extends from the at least one second lever finger 324 toward the inner surface of the cover 104. The second lever protrusion 336 is configured to secure the second lever biasing member 332 when the second lever biasing member 332 is assembled with the second lever 300. In the depicted aspect, the at least one second lever finger 324 includes two second lever contact fingers 338 disposed on the middle section 318 of the second lever 300. The second lever contact fingers 338 each extend from the second lever 300 toward the inner surface 124 of the cover 104 and are configured for contacting the cover 104 when the second lever 300 is actuated toward the depressed position.

A first lever arm 244 extending from the first lever 200 features a first magnet 248 fixed to the first lever 200 (for example, the first magnet 248 can be glued onto an end of the first lever arm 244 opposite from the first lever 200). A second lever arm 342 extending from the second lever 300 features a second magnet 344 fixed to the second lever 300 (for example, the second magnet 344 can be retained in the second lever arm 342 by a snap-fit connection). As shown in FIG. 2, a controller 400 disposed within the handle includes a printed circuit board (PCB) 404 mounted on the inner surface 124 of the cover 104 between the first and second gripping areas 110, 112 of the handle 100. The controller 400 includes a first sensor 406 and a second sensor 410 mounted on the PCB 404. The first sensor 406 and the second sensor 410 are respectively a first Hall effect sensor and a second Hall effect sensor, and according to the present disclosure the first Hall effect sensor is a linear, analog output, Hall effect sensor and the second Hall effect sensor is a binary, digital output, Hall effect sensor. The first magnet 248 is a sensor target of the first sensor 406 such that the first sensor 406 is configured for detecting the position of the first sensor target 248 with respect to the extended position or the depressed position of the first lever 200. In this regard, a detected position of the first sensor target 248 is dispositive of a position of the first lever 200 with respect to the extended position or the depressed position of the first lever 200. The second magnet 344 is a sensor target of the second sensor 410 such that the second sensor 410 is configured for detecting the position of the second sensor target 344 with respect to the extended position or the depressed position of the second lever 300. In this regard, a detected position of the second sensor target 344 is dispositive of a position of the second lever 300 with respect to the extended position or the depressed position of the second lever 300.

As shown in FIG. 9, when the first lever 200 is in the depressed position, the first sensor target 248 is maximally far from the first sensor 406 with respect to a stroke defined by a range of motion of the first lever 200 between the extended position and the depressed position of the first lever 200. When the second lever 300 is in the depressed position, the second sensor target 344 is maximally close to the second sensor 410 with respect to a stroke defined by a range of motion of the second lever 300 between the extended position and the depressed position of the second sensor 410.

The controller 400 is configured to continuously determine or detect the position of the first sensor target 248 and the second sensor target 344. Because the first sensor 406 is an analog Hall effect sensor, the controller 400 is configured to register the position of the first magnet 248 as an analog, i.e. non-binary input. Because the second sensor 410 is a digital Hall effect sensor, the controller 400 is configured to register the position of the second magnet 344 as a digital input such that the controller registers one of two signal outputs from the second Hall effect sensor 410 based on whether the second magnet 344 is within a certain proximity of the second sensor 410 along the stroke of the second magnet 344.

In an embodiment of the handle 100, the first lever 200 is a clutch lever and the second lever 300 is a brake lever, and the controller 400 is operatively associated with the clutch lever 200 and the brake lever 300. The controller 400 is configured for controlling an associated lawn mower (not shown), including setting each of a top ground speed (which is between a maximum ground speed and a minimum ground speed) and a minimum ground speed, determining or detecting a position of the clutch lever 200 and the brake lever 300 with respect to the respective extended position and depressed position, and relating the determined or detected position of the clutch lever 200 to an output ground speed that is between the top ground speed and the minimum ground speed. By relating the determined or detected position of the clutch lever 200 to an output ground speed that is between the top ground speed and the minimum ground speed, a user is able to feather the clutch lever 200, and in turn the output ground speed, during operation of the lawn mower between the minimum ground speed and the top ground speed.

The controller 400 is also configured to readjust the top ground speed and the minimum ground speed of the lawn mower while the lawn mower is in operation. This is performed through a control panel 412, an exemplary embodiment of which is shown in FIG. 1. The control panel 412 is disposed on the handle exterior 106 of the cover 104 between the first gripping area 110 and the second gripping area 112, opposite from the PCB 404, and features buttons 416 configured for controlling the lawn mower. According to one aspect, the controller 400 is configured to start an associated motor (not shown) of the lawn mower when the brake lever 300 is actuated toward the depressed position and at least one of the buttons 416, such as a start button, is also actuated.

With reference to FIG. 5, a button pad 418 is disposed within the cover 104 between the buttons 416 and the PCB 404, the button pad being configured for transferring force imparted on at least one pressed button to the PCB 404. In an embodiment, the button pad 418 is formed of rubber capable of translating force imparted on at least one pressed button 416 to an electrical signal by opening or closing a switching element. The buttons 416 on the control panel 412 are configured to control the lawn mower so as to readjust the top ground speed and minimum ground speed of the lawn mower, and the minimum ground speed of the lawn mower may be set to zero.

It will be appreciated that various elements of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An adjustable electric control handle for a lawn mower comprising:
    a first lever configured to actuate between an extended position and a depressed position,
    a second lever configured to actuate between an extended position and a depressed position, the second lever facing the first lever such that a section of the first lever is closer to the second lever when the first lever is in the depressed position relative to the extended position, and a section of the second lever is closer to the first lever when the second lever is in the depressed position relative to the extended position,
    a controller operatively associated with each of the first lever and the second lever so as to determine a position of the first lever with respect to the depressed position or the extended position of the first lever, and a position of the second lever with respect to the depressed position or the extended position of the second lever, and
    the first lever defining an interior having an opening facing the second lever such that the interior of the first lever is configured for receiving the second lever when at least one of the first lever and the second lever are actuated toward the respective depressed position.

2. The adjustable electric control handle of claim 1, wherein the controller comprises:
    a first sensor target fixed to the first lever,
    a second sensor target fixed to the second lever,
    a first sensor configured for detecting the position of the first sensor target, a detected position of the first sensor target is dispositive of a position of the first lever with respect to the extended position or the depressed position of the first lever, and
    a second sensor configured for detecting the position of the second sensor target, a detected position of the second sensor target is dispositive of a position of the second lever with respect to the extended position or the depressed position of the second lever.

3. The adjustable electric control handle of claim 2, wherein the controller is configured to continuously determine the position of the first sensor target and register the position of the first sensor target as a non-binary input.

4. The adjustable electric control handle of claim 2, wherein the controller is configured to continuously determine the position of the first sensor target and register the position of the first sensor target as an analog input.

5. The adjustable electric control handle of claim 2, wherein the first sensor target and the second sensor target are respectively a first magnet and a second magnet, and the first sensor and the second sensor are respectively a first Hall effect sensor and a second Hall effect sensor.

6. The adjustable electric control handle of claim 5, wherein the first Hall effect sensor is a linear output Hall effect sensor and the second Hall effect sensor is a digital output Hall effect sensor.

7. The adjustable electric control handle of claim 2, wherein when each of the first lever and the second lever are in the respective depressed positions, the first sensor target is maximally far from the first sensor with respect to a stroke defined by a range of motion of the first lever between the extended position and the depressed position of the first lever, and the second sensor target is maximally close to the second sensor with respect to a stroke defined by a range of motion of the second lever between the extended position and the depressed position of the second sensor.

8. The adjustable electric control handle of claim 1, further comprising a first button defined by a portion of the first lever raised away from the second lever and a second button defined a portion of the second lever raised away from the first lever,
    wherein each of the first lever and the second lever are configured to be actuated towards the respective depressed positions by pressing the first button and second button respectively.

9. The adjustable electric control handle of claim 1, wherein:
    the first lever includes a curved middle portion and at least one side wall extending therefrom defining the interior of the first lever, and
    the second lever includes a body and a finger extending therefrom defining an interior of the second lever with an opening facing the first lever such that the second lever is configured for receiving the first lever when at least one of the first lever and the second lever are actuated towards the respective depressed position.

10. An adjustable electric control handle for a lawn mower comprising:
    a cover,
    a first lever disposed within the cover and pivotally fixed to the cover, and
    a second lever disposed within the cover, the second lever being pivotally fixed to the first lever and the cover such that the first lever and second lever share a common axis of rotation with respect to the cover,
    wherein the first lever and the second lever face each other within the cover such that a middle section of the first lever disposed within the cover is closer to the second lever when the first lever is in a depressed position relative to an extended position of the first lever, and a middle section of the second lever disposed within the cover is closer to the first lever when the second lever is in a depressed position relative to an extended position of the second lever.

11. The adjustable electric control handle of claim 10, further comprising a pin extending from the second lever and into a hinge of the first lever so as to pivotally fix the first lever with the second lever,
    wherein the pin extends through the hinge and into the cover to pivotally fix both the first lever and second lever to the cover,
    and wherein the pin and hinge define a common axis of rotation between the first lever, the second lever, and the cover.

12. The adjustable electric control handle of claim 10, further comprising:
    a first sensor target fixed to the first lever,
    a second sensor target fixed to the second lever,
    a first sensor configured for detecting the position of the first sensor target, a detected position of the first sensor target is dispositive of a position of the first lever with respect to the extended position or the depressed position of the first lever, and
    a second sensor configured for detecting the position of the second sensor target, a detected position of the second sensor target is dispositive of a position of the second lever with respect to the extended position or the depressed position of the second lever.

13. The adjustable electric control handle of claim 10, further comprising a biasing member disposed between at least one of the first lever and the second lever and the cover, the biasing member being configured for biasing at least one of the first lever and second lever away from the other of the first lever and the second lever and toward the respective extended position.

14. The adjustable electric control handle of claim 10, wherein the depressed position of the first lever defines an end of a range of motion of the first lever that is unobstructed by the second lever, the depressed position of the second lever defines an end of a range of motion of the second lever that is unobstructed by the first lever, and the first lever and the second lever are configured for being simultaneously actuated into the respective depressed positions.

15. The adjustable electric control handle of claim 10, further comprising a first button defined by a raised portion of the first lever which extends through a first hole defined by the cover, and a second button defined by a raised portion of the second lever which extends through a second hole defined by the cover, wherein each of the first lever and the second lever are configured to be actuated toward the respective depressed positions by pressing the first button and second button through the cover respectively.

16. The adjustable electric control handle of claim 10, further comprising at least one finger extending from at least one of the first lever and the second lever, the at least one finger being configured for contacting the cover when the lever the finger extends from is in the depressed position.

17. The adjustable electric control handle of claim 10, wherein:
   the first lever includes at least one end connected to the middle section of the first lever, the first lever being pivotally fixed to the cover at the at least one end of the first lever, and
   the second lever includes at least one end connected to the middle section of the second lever, the second lever being pivotally fixed to each of the first lever and the cover at the at least one end of the second lever.

18. A control assembly for a lawn mower comprising:
   a clutch lever configured to actuate between an extended position and a depressed position,
   a brake lever configured to actuate between an extended position and a depressed position, the brake lever pivotally fixed with the clutch lever such that the clutch lever and the brake lever share a common axis of rotation,
   a first sensor target fixed to the clutch lever such that a position of the first sensor target is dispositive of a position of the clutch lever between the extended position and the depressed position of the clutch lever,
   a second sensor target fixed to the brake lever such that a position of the second sensor target is dispositive of a position of the brake lever between the extended position and the depressed position of the brake lever,
   a controller configured for controlling a ground speed of the lawn mower, including setting each of a top ground speed which is a ground speed between a maximum ground speed and a minimum ground speed and the minimum ground speed, detecting a position of each of the clutch lever and the brake lever with respect to the extended position and depressed position, and relating the detected position of the clutch lever to an output ground speed that is between the top ground speed and the minimum ground speed,
   a first sensor incorporated into the controller and configured for detecting the position of the first sensor target, and
   a second sensor incorporated into the controller and configured for detecting the position of the second sensor target,
   wherein the controller continuously detects the position of the clutch lever during operation of the lawn mower so as to enable modulation of the output ground speed during operation of the lawn mower.

19. The control assembly for a lawn mower according to claim 18, wherein the controller is configured to readjust the top ground speed while the lawn mower is in operation.

20. The control assembly for a lawn mower according to claim 18, further comprising an interior defined in at least one of the clutch lever and the brake lever, wherein the interior includes an opening facing the other of the clutch lever and the brake lever, the opening being configured for receiving the other of the clutch lever and the brake lever when at least one of the clutch lever and the brake lever are actuated toward the respective depressed position.

* * * * *